(12) United States Patent  (10) Patent No.: US 7,500,692 B2
Espenshade  (45) Date of Patent: Mar. 10, 2009

(54) BASKET ASSEMBLY FOR A STROLLER

(75) Inventor: Gregg R. Espenshade, Narvon, PA (US)

(73) Assignee: Graco Children's Products Inc., Exton, PA (US)

( * ) Notice: Subject to any disclaimer, the term of this patent is extended or adjusted under 35 U.S.C. 154(b) by 352 days.

(21) Appl. No.: 10/806,354

(22) Filed: Mar. 23, 2004

(65) Prior Publication Data

US 2004/0222608 A1    Nov. 11, 2004

Related U.S. Application Data

(60) Provisional application No. 60/457,322, filed on Mar. 26, 2003.

(51) Int. Cl.
*B62B 1/00* (2006.01)
*B62B 3/00* (2006.01)

(52) U.S. Cl. .................. 280/647; 280/650; 280/658; 280/47.38

(58) Field of Classification Search ............... 280/642, 280/647, 650, 657, 658, 47.38, 655; 224/618, 224/633, 634, 409, 411, 420, 425; 292/DIG. 11, 292/DIG. 12, DIG. 30, DIG. 38
See application file for complete search history.

(56) References Cited

U.S. PATENT DOCUMENTS

| 1,887,763 | A | * | 11/1932 | Juvet ........................ 108/38 |
| 4,317,581 | A | | 3/1982 | Kassai |
| 4,346,912 | A | | 8/1982 | Habib |
| 4,491,335 | A | | 1/1985 | Evron |
| 4,763,919 | A | * | 8/1988 | Nakao et al. ............. 280/658 |
| 4,817,982 | A | | 4/1989 | Kassai |
| 4,828,278 | A | | 5/1989 | Shinroku et al. |
| 4,923,208 | A | | 5/1990 | Takahashi et al. |
| 4,930,697 | A | | 6/1990 | Takahashi et al. |
| 4,953,887 | A | | 9/1990 | Takahashi et al. |
| 5,110,150 | A | | 5/1992 | Chen |
| 5,427,402 | A | | 6/1995 | Huang |
| 5,454,584 | A | | 10/1995 | Haut et al. |
| 5,513,864 | A | | 5/1996 | Huang |
| 5,605,409 | A | | 2/1997 | Haut et al. |

(Continued)

FOREIGN PATENT DOCUMENTS

EP    0 483 042 A1    4/1992

(Continued)

OTHER PUBLICATIONS

Graco MetroLite Stroller Instruction Sheet, 2001, 1 page, Graco Childrens's Products Inc.

(Continued)

*Primary Examiner*—Hau V Phan
(74) *Attorney, Agent, or Firm*—Lempia Braidwood LLC

(57) ABSTRACT

A stroller includes a stroller frame, a basket frame including a pair of arms mounted to the stroller frame and a rear cross member extending between the pair of arms, a latch mount coupled to the rear cross member, a basket mounted to pivot relative to the basket frame, and a latch coupled to the basket to releasably engage the latch mount, thereby allowing the basket to move between a closed position and an open position relative to the basket frame.

18 Claims, 10 Drawing Sheets

U.S. PATENT DOCUMENTS

| | | | |
|---|---|---|---|
| 5,622,377 A | 4/1997 | Shamie | |
| 5,645,293 A | 7/1997 | Cheng | |
| 5,718,444 A | 2/1998 | Huang | |
| 5,741,021 A | 4/1998 | Saint et al. | |
| 5,845,924 A | 12/1998 | Huang | |
| 5,876,046 A | 3/1999 | Courtney et al. | |
| 5,882,030 A | 3/1999 | Haut | |
| 5,893,577 A | 4/1999 | Takahashi | |
| 5,938,230 A | 8/1999 | Huang et al. | |
| 5,954,404 A | 9/1999 | Suzuki | |
| 5,988,669 A | 11/1999 | Freese et al. | |
| 5,988,670 A | 11/1999 | Song et al. | |
| 6,045,145 A | 4/2000 | Lan | |
| 6,062,588 A | 5/2000 | Cheng | |
| 6,062,589 A | 5/2000 | Cheng | |
| 6,073,957 A | 6/2000 | Lan | |
| 6,095,548 A | 8/2000 | Baechler | |
| 6,099,019 A | 8/2000 | Cheng | |
| 6,102,432 A | 8/2000 | Cheng | |
| 6,105,998 A | 8/2000 | Baechler et al. | |
| 6,116,624 A | 9/2000 | Hu | |
| 6,120,041 A | 9/2000 | Gehr, Jr. et al. | |
| 6,135,487 A | 10/2000 | Flannery et al. | |
| 6,139,046 A | 10/2000 | Aalund et al. | |
| 6,152,340 A | 11/2000 | Chen et al. | |
| 6,155,592 A | 12/2000 | Hsia | |
| 6,155,740 A | 12/2000 | Hartenstine | |
| 6,189,914 B1 | 2/2001 | Worth et al. | |
| 6,241,273 B1 | 6/2001 | Gehr | |
| 6,273,451 B1 | 8/2001 | Julien et al. | |
| 6,276,709 B1 | 8/2001 | Chen et al. | |
| 6,286,844 B1 | 9/2001 | Cone, II et al. | |
| 6,361,056 B1 | 3/2002 | Chen et al. | |
| 6,464,244 B1 | 10/2002 | Cheng | |
| 6,478,327 B1 * | 11/2002 | Hartenstine et al. | 280/642 |
| 6,626,451 B1 | 9/2003 | Song | |
| 6,666,473 B2 | 12/2003 | Hartenstine et al. | |
| 2001/0013688 A1 | 8/2001 | Warner, Jr. et al. | |
| 2001/0013689 A1 | 8/2001 | Cone, II et al. | |
| 2001/0040357 A1 | 11/2001 | Barrett et al. | |
| 2002/0005628 A1 | 1/2002 | Hartenstine et al. | |
| 2002/0084626 A1 | 7/2002 | Ageneau | |
| 2002/0093178 A1 | 7/2002 | Turner et al. | |
| 2002/0109321 A1 * | 8/2002 | Turner et al. | 280/47.38 |
| 2003/0094791 A1 | 5/2003 | Hartenstine et al. | |
| 2003/0122351 A1 | 7/2003 | Yeh | |
| 2003/0201625 A1 | 10/2003 | Espenshade et al. | |
| 2003/0201626 A1 | 10/2003 | Hartenstine et al. | |
| 2004/0026895 A1 | 2/2004 | Cheng | |
| 2004/0046364 A1 | 3/2004 | Chen | |
| 2004/0090046 A1 | 5/2004 | Hartenstine et al. | |
| 2004/0124611 A1 | 7/2004 | Gong et al. | |

FOREIGN PATENT DOCUMENTS

| | | |
|---|---|---|
| EP | 1 153 817 A1 | 11/2001 |
| WO | WO 03/035448 A | 5/2003 |

OTHER PUBLICATIONS

Jeep Tandem Stroller Instruction Sheet, 2002, pp. 1-12, Kolcraft® Enterprises, Inc.

* cited by examiner

BASKET ASSEMBLY FOR A STROLLER

CROSS-REFERENCE TO RELATED PATENT APPLICATIONS

This application claims the benefit of U.S. provisional application No. 60/457,322, filed Mar. 26, 2003, which is incorporated by reference herein in its entirety.

FIELD OF THE INVENTION

This invention relates to a basket assembly for a stroller. More specifically, this invention relates to a basket assembly that can be accessed easily, even while the seat back of the child seat is reclined, such as when an infant carrier is mounted to the child seat.

BACKGROUND OF THE INVENTION

Many strollers are equipped with baskets under the child seat for storage of various items, such as purses, diaper bags, groceries, and child toys. The basket typically is accessed from the rear of the stroller in an area below the seat back of the child seat. Accordingly, when the seat back is partially or fully reclined, access to the basket may be more difficult. This problem is greatest when the seat back is fully reclined, which occurs, for example, when a child in the child seat is sleeping or when an infant carrier is attached to the child seat.

Thus, there is a need for a stroller that includes a basket that is easy to access regardless of the positioning of the seat back of the child seat.

SUMMARY OF THE INVENTION

An aspect of the invention relates to a stroller that includes a stroller frame, a basket frame including a pair of arms mounted to the stroller frame and a rear cross member extending between the pair of arms, a latch mount coupled to the rear cross member, a basket mounted to pivot relative to the basket frame, and a latch coupled to the basket to releasably engage the latch mount, thereby allowing the basket to move between a closed position and an open position relative to the basket frame.

According to another aspect of the invention, a basket assembly, for use on a stroller, includes a basket frame including a pair of arms mounted to a frame of the stroller and a rear cross member extending between the pair of arms, a latch mount coupled to the rear cross member, a basket mounted to pivot relative to the basket frame, and a latch coupled to the basket to releasably engage the latch mount, thereby allowing the basket to move between a closed position and an open position relative to the basket frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
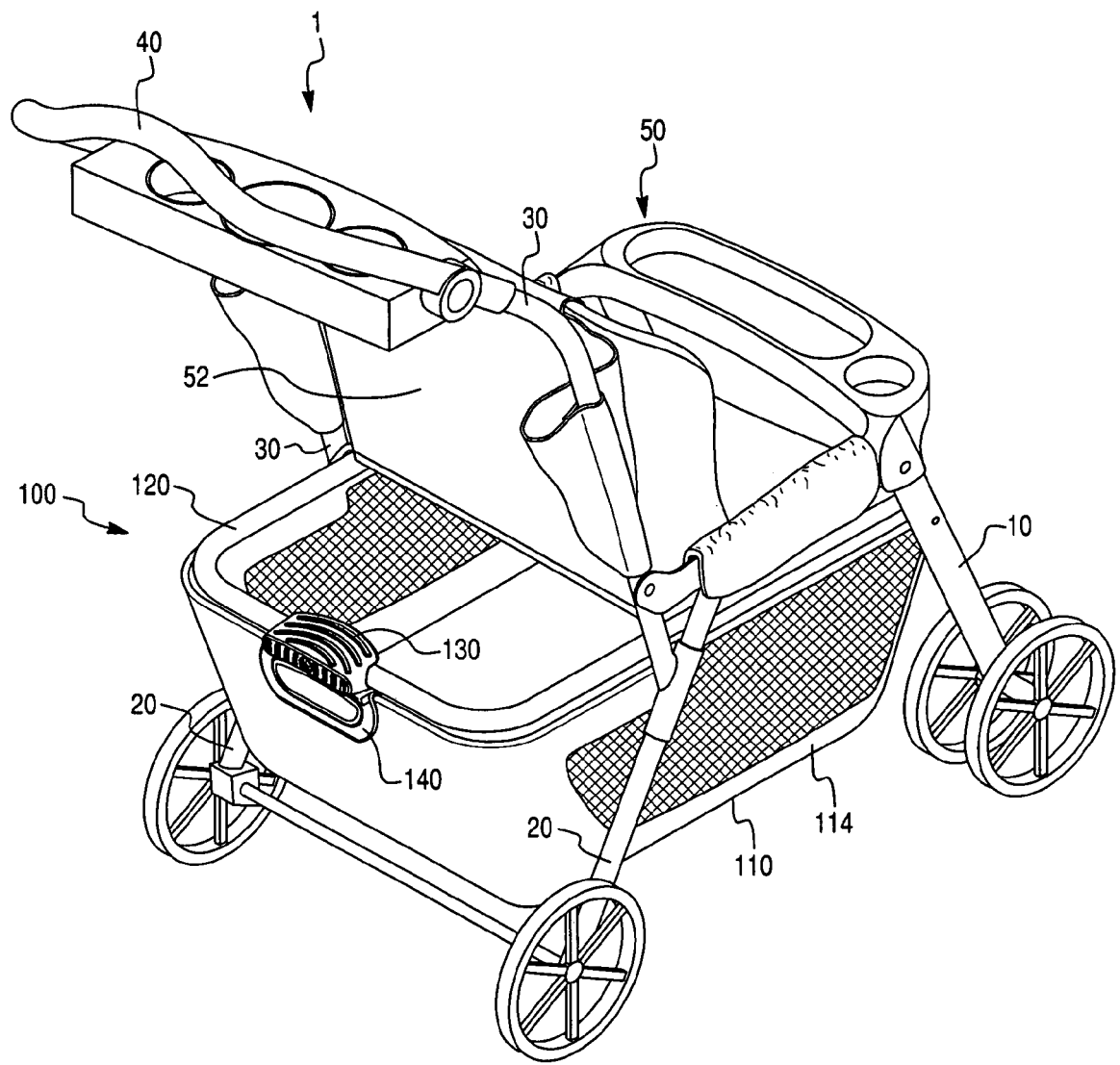
FIG. 1 is a rear perspective view of a stroller in accordance with the invention with the seat back in an inclined position and the basket in a closed position.
Figure 2:
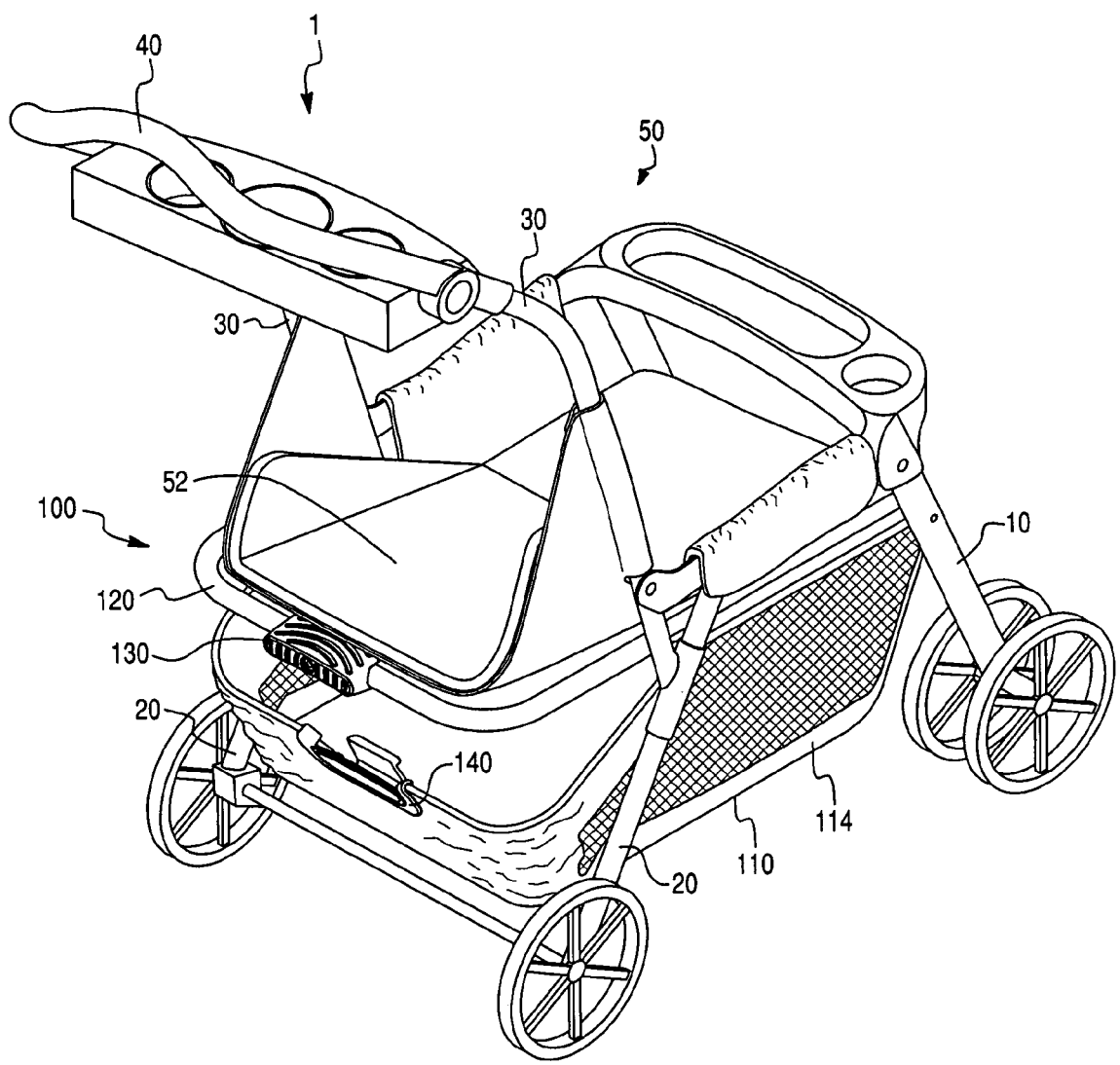
FIG. 2 is a rear perspective view of the stroller of FIG. 1 with the seat back in a reclined position and the basket in a partially open position.
Figure 3:
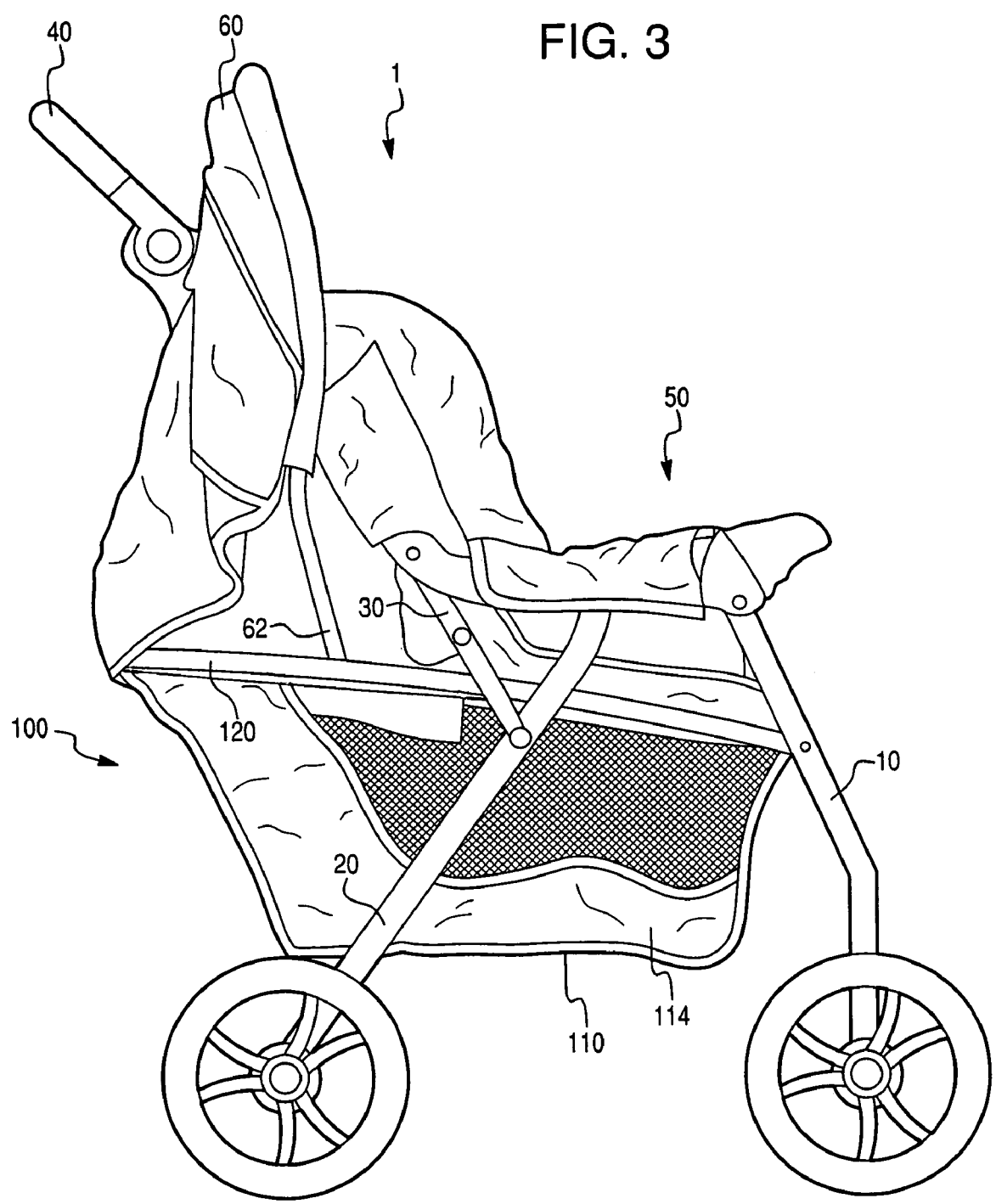
FIG. 3 is a side elevation view of the stroller in accordance with the invention.

FIGS. 1-3 illustrates a stroller 1 that includes a basket assembly 100 in accordance with the invention. The frame of the stroller 1 generally includes right and left front legs 10, right and left rear legs 20, and a handle assembly that includes right and left push arms 30 terminating in a handle grip portion 40. The push arms 30 can be pivotally connected to the rear legs 20. The stroller 1 also includes a child seat 50 that has a reclinable seat back 52. The reclinable seat back 52 can pivot between an upright position (as shown in FIG. 1), a fully reclined position (as shown in FIG. 2), and intermediate partially reclined positions, depending on the needs of a child sitting in the child seat 50. The stroller 1 also can include a canopy 60 (not shown in FIGS. 1 and 2 for ease of understanding the invention) supported by a canopy frame 62.

The basket assembly 100 of the stroller 1 is designed so that the basket 110 can move between a closed position and an open position. FIG. 1 shows the basket 110 in the closed position, and FIG. 2 shows the basket 110 in a partially open position. As can be seen from FIG. 2, a user can easily access the interior of the basket 110 even when the seat back 52 of the child seat 50 is in the fully reclined position.

Figure 4:
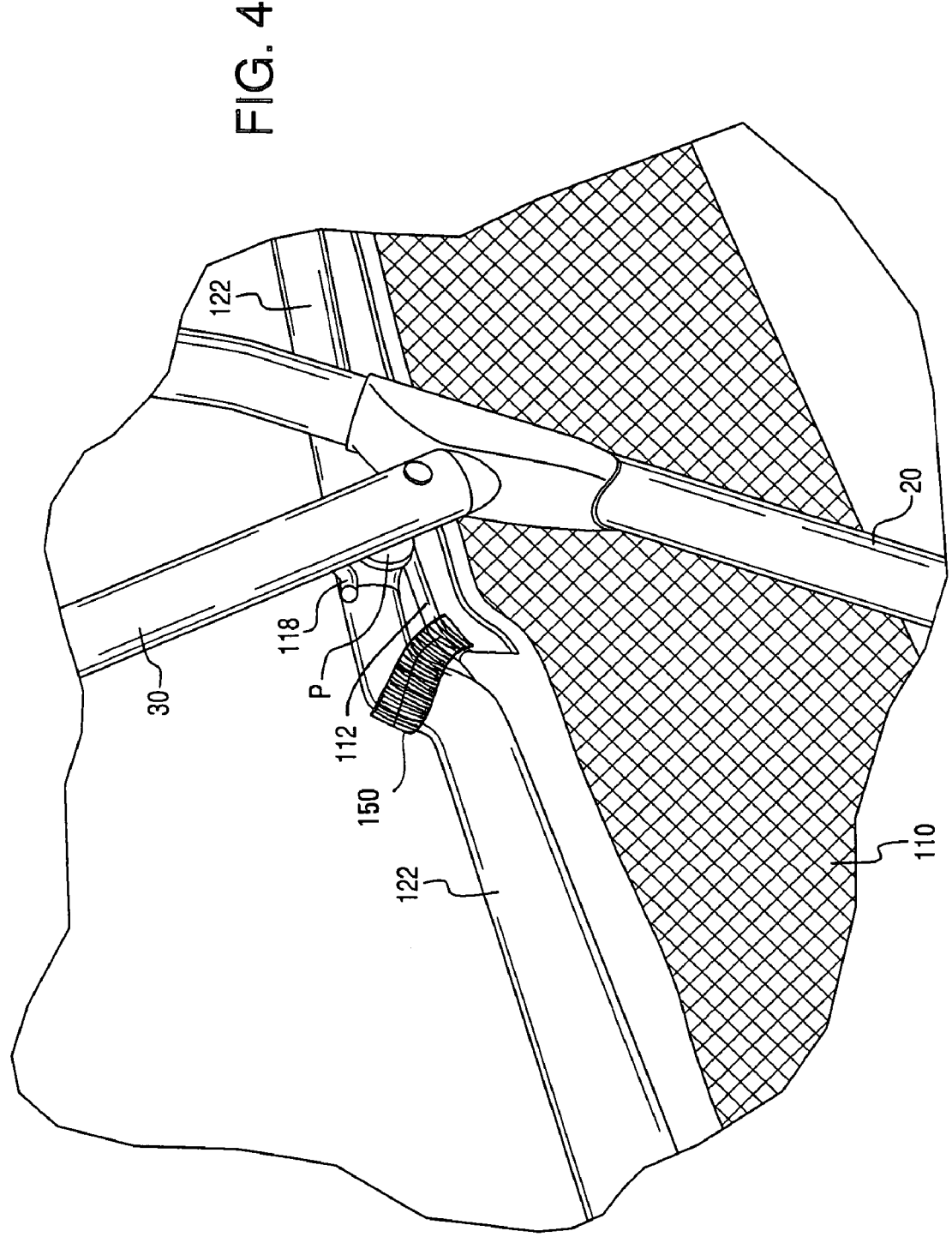
FIG. 4 is a enlarged detail view showing connection of the basket rim to the stroller frame.
Figure 5:
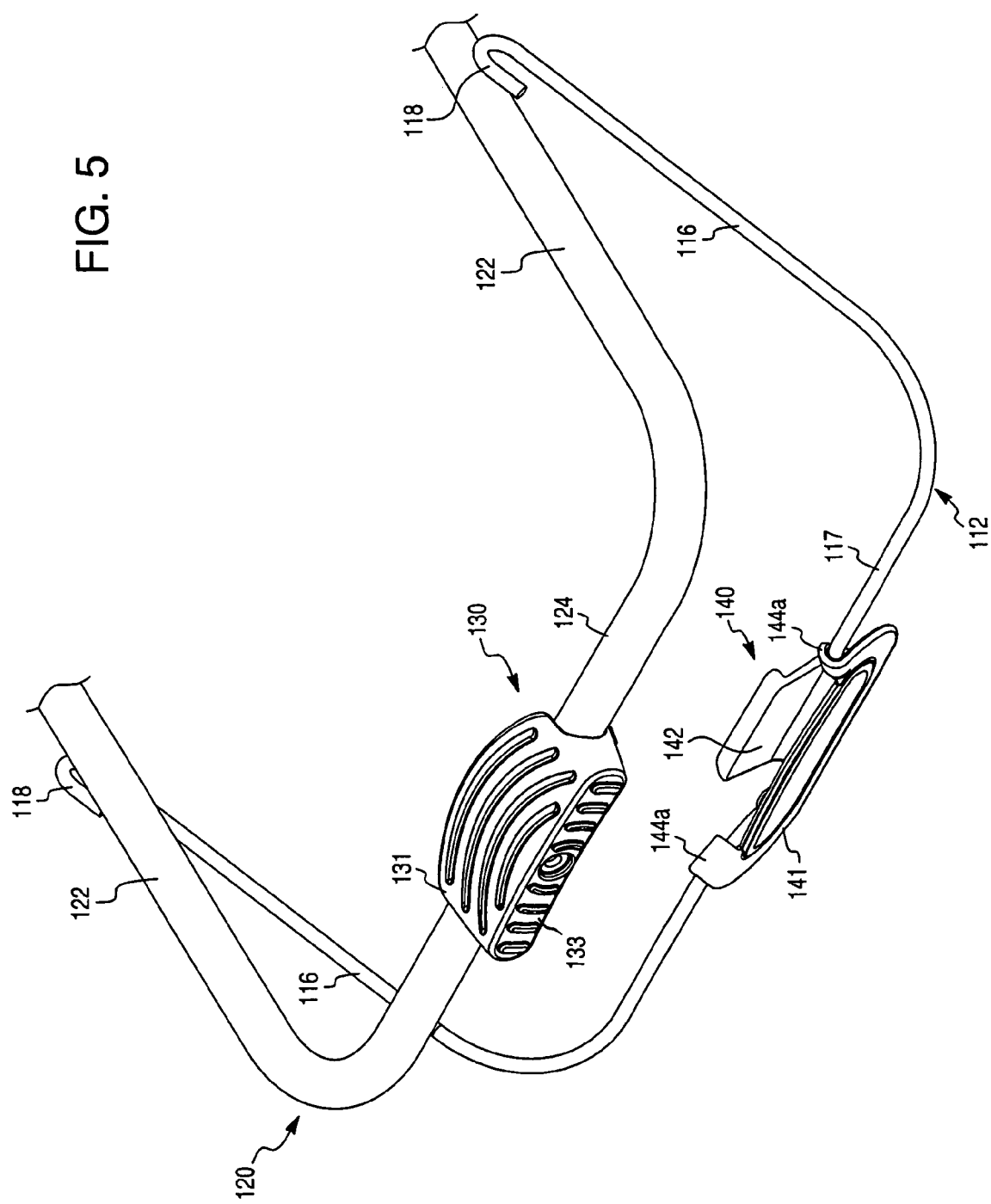
FIG. 5 is a detail, rear perspective view of the basket frame member, the basket rim, the latch mount, and the latch in accordance with the invention with the latch in the open, unlatched position.
Figure 6:
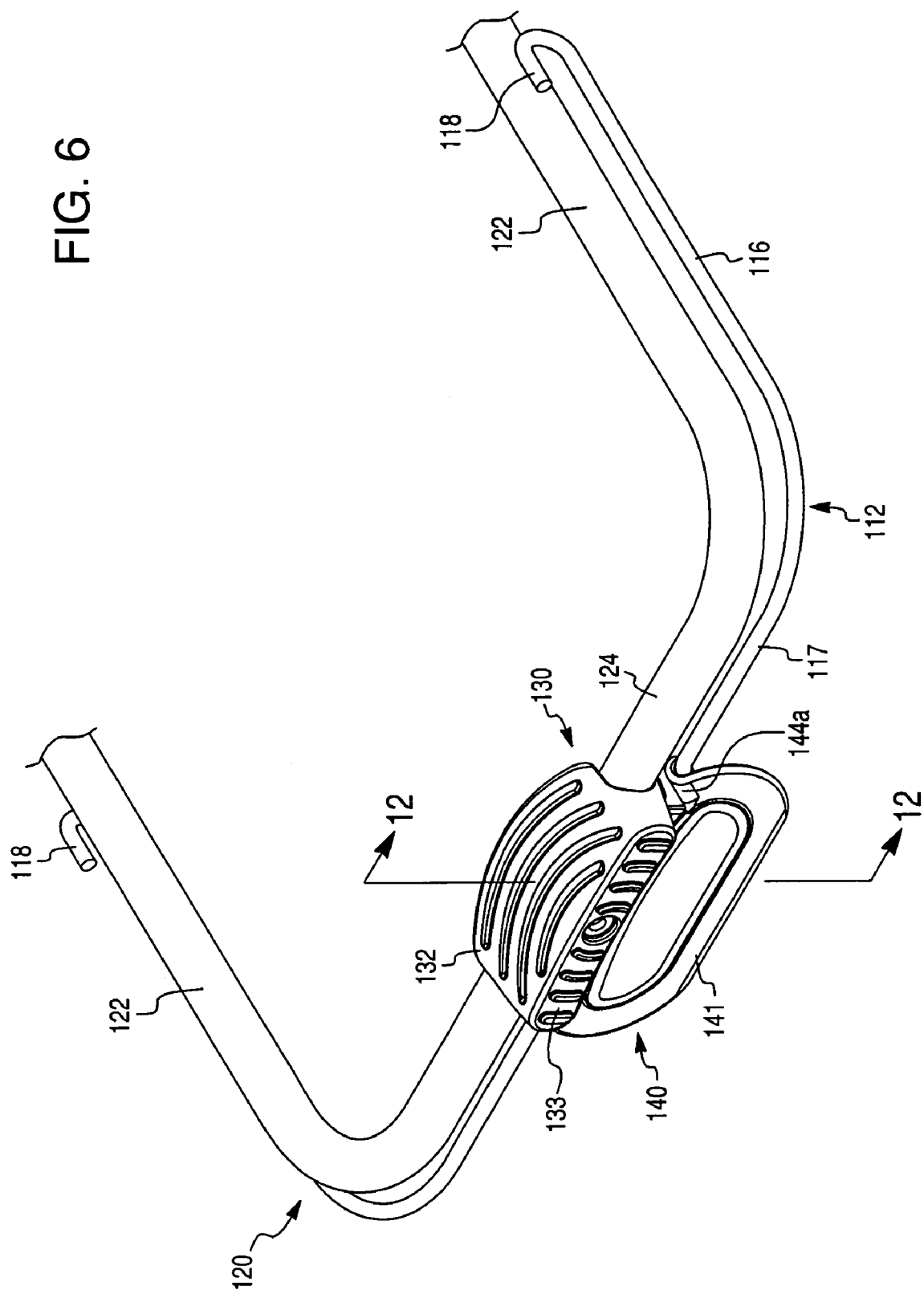
FIG. 6 is a detail, rear perspective view of the basket frame member, the basket rim, the latch mount, and the latch in accordance with the invention with the latch in the closed, latched position.
Figure 7:
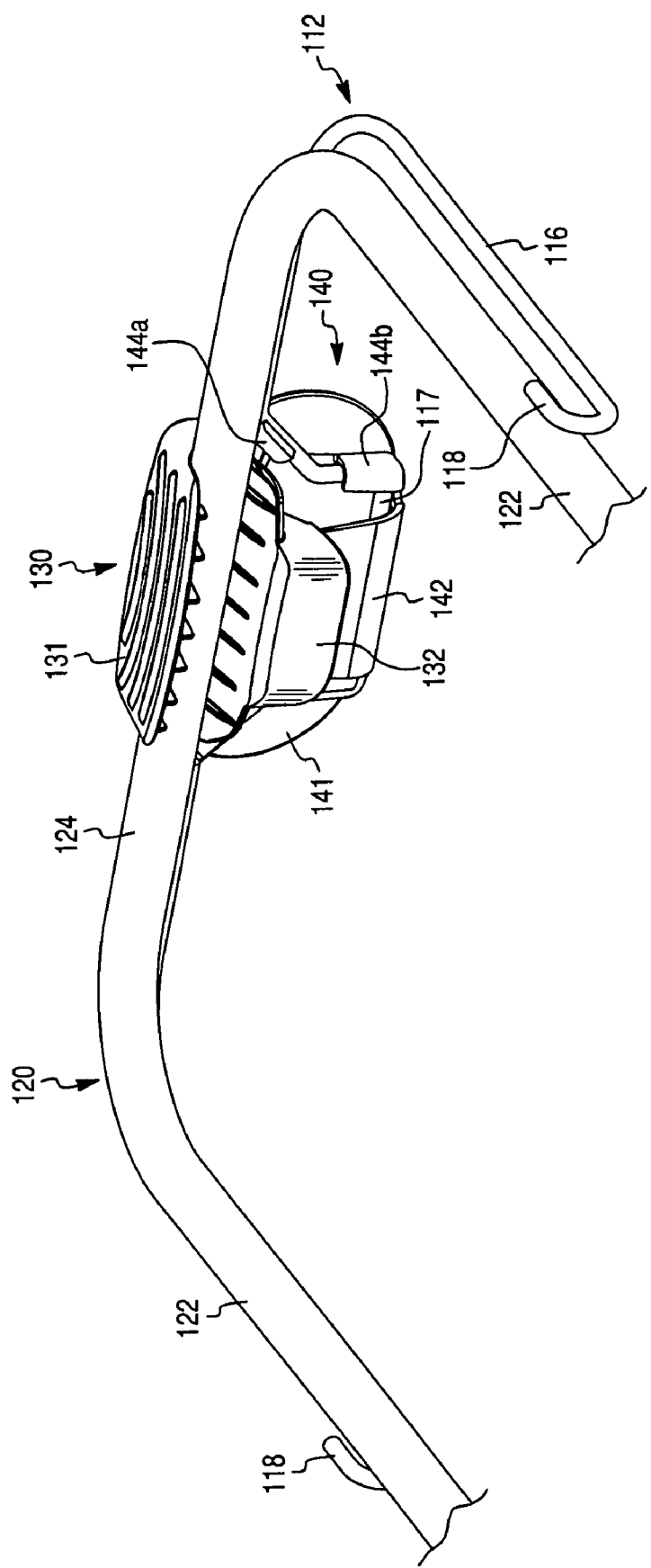
FIG. 7 is a detail, front perspective view of the basket frame member, the basket rim, the latch mount, and the latch in accordance with the invention with the latch in the closed, latched position.

The basket assembly 100 of the stroller 1 can include a basket frame 120, a latch mount 130, the basket 110, and a latch 140. The basket assembly 100 is designed with relatively few parts. The basket frame 120 has a pair of arms 122 and a rear cross member 124 extending between the pair of arms 122, as shown in FIGS. 5-7. The basket frame 120 is a generally U-shaped tubular structure. Each arm 122 is pivotally mounted to a respective rear leg 20 of the stroller frame, as shown in FIG. 3, and to a pivot P connected to an inboard side of the respective push arm 30, as shown in FIG. 4.

Figure 8:
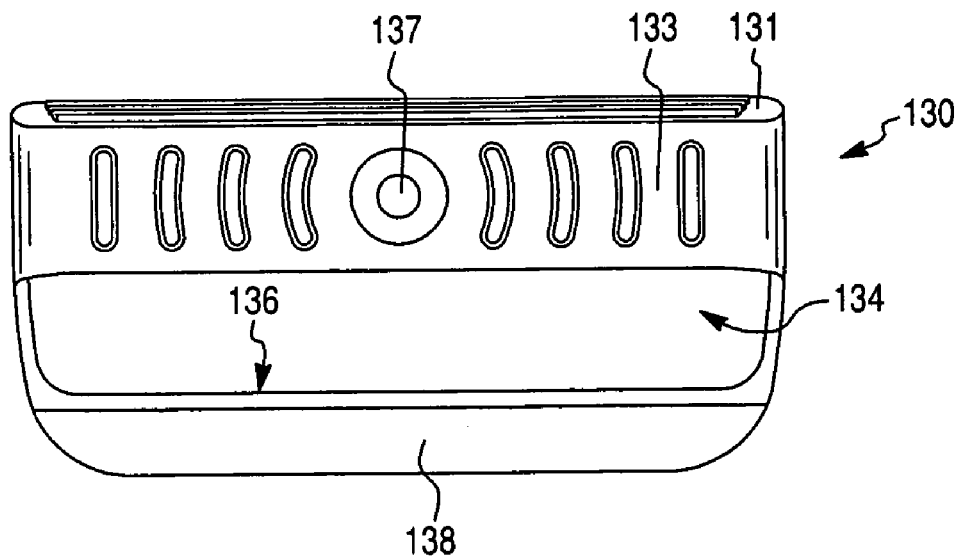
FIG. 8 is a detail front elevation view of the latch mount.
Figure 9:
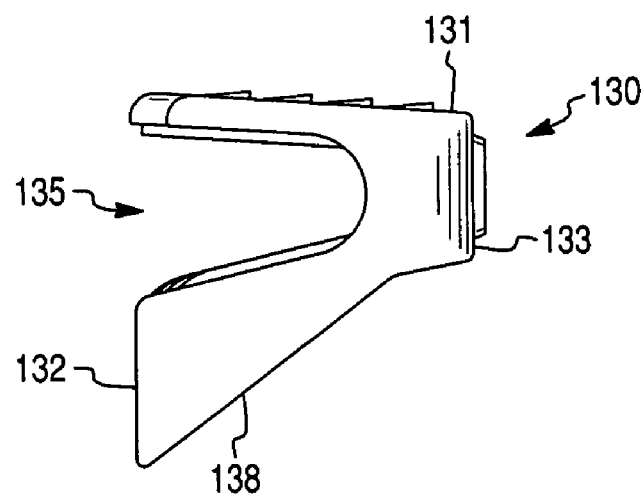
FIG. 9 is a detail side elevation view of the latch mount.

The latch mount 130 is coupled to the rear cross member 124 of the basket frame 120. The latch mount 130 can be centrally disposed on the rear cross member 124, as shown in FIGS. 5 and 7. FIGS. 8 and 9 illustrate the latch mount 130 in detail. The latch mount 130 has a top face 131, a rear face 132, a front face 133, a lower face 138, a pocket 134 that opens to the rear of the stroller 1, and a channel 135 that opens to a front of the stroller 1. The pocket 134 includes an upwardly facing shoulder 136 for receipt of the latch 140, to be described below. The channel 135 is configured to receive the rear cross member 124 of the basket frame 120. The front face 133 of the latch mount 130 has an aperture 137 through which a fastener, such as a rivet, can be inserted to secure the latch mount 130 to the rear cross member 124. The latch mount 130 can also include ribs (not labeled) on its top face 131 and rear face 132, and in the channel 135. The ribs on the top face 131 can serve as a visual indicator to identify where a user can place his foot during folding of the stroller, and the ribs on the rear face 132 can serve as a visual indicator to identify where a user can place his hand to open/close the basket 110.

The basket 110 of the basket assembly 100 is mounted to pivot relative to the basket frame 120. The basket 110 includes an upper rim 112, best seen in FIGS. 5-7, and an enclosure 114 coupled to the upper rim 112. The enclosure 114 can be formed of any suitable material, including molded plastic or, as shown in the illustrated embodiment, fabric. The fabric enclosure 114 can include a sleeve to receive the upper rim 112, as shown in FIG. 4, or the fabric enclosure 114 can be coupled to the rim via straps, snaps, or other fasteners. A front portion of the fabric enclosure 114 that extends between the front and rear legs 20, 30, can be coupled directly to the basket frame 120 by straps, snaps, or other fasteners. In addition, each side of the basket assembly 100 can include a strap 150 of webbing material that extends from the basket 110 around the respective arm 122 of the basket frame 120, as shown in FIG. 4. The strap 150 functions to limit movement of the upper rim 112 of the basket 110 relative to the basket frame 120 during folding and unfolding of the stroller.

The upper rim 112 of the basket 110 can be a wire frame member. The upper rim 112 includes a pair of arms 116 and a rear cross member 117 extending between the arms 116. Each arm 116 terminates in a hook 118 adapted to be pivotally mounted to the respective pivots P so that the upper rim 112, and hence the basket 110, can pivot relative to the push arms 30 of the stroller frame. Because the basket rim 112 includes hooks 118 to couple to pivots P, as opposed to being riveted or permanently coupled to pivots P, the basket 110 can be packaged disassembled from the stroller frame in a compact arrangement for relatively easy post-purchase assembly by the user. In addition to supporting the basket 110, the basket frame 120 also can serve to support the seat bottom of the child seat 50, such as described in U.S. Pat. No. 6,666,473, issued Dec. 23, 2003, which is incorporated herein in its entirety.

Figure 10:
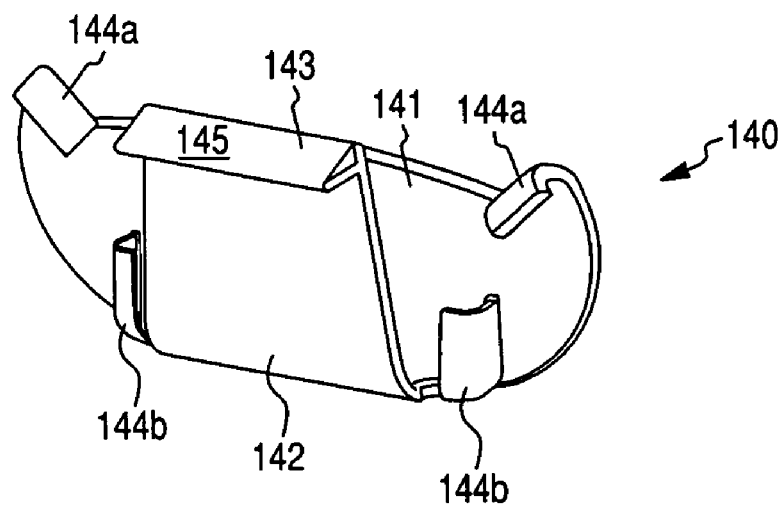
FIG. 10 is a detail rear perspective view of the latch.
Figure 11:
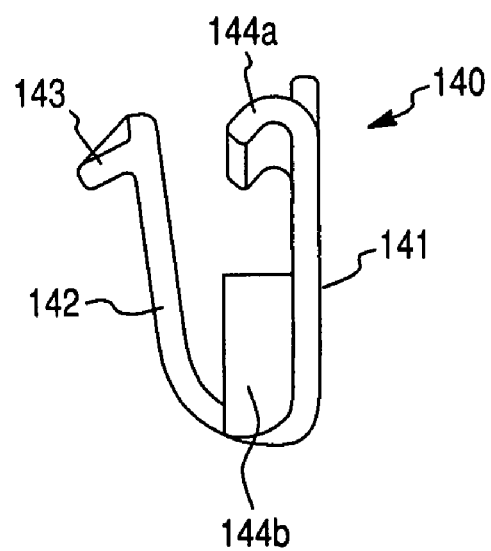
FIG. 11 is a detail side elevation view of the latch.
Figure 12:
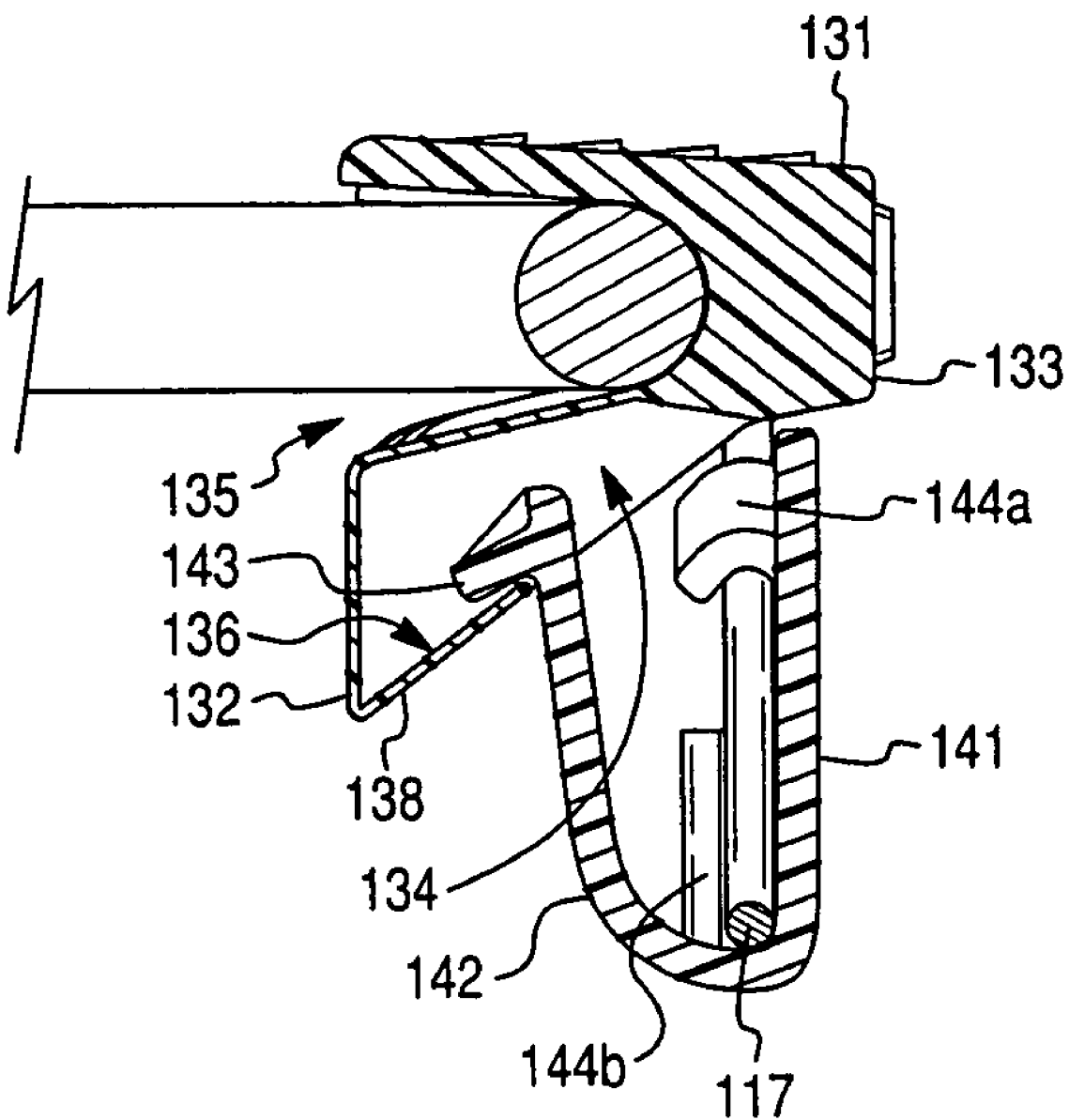
FIG. 12 is a cross-sectional side view of the latch mount and latch in the closed, latched position as taken along line 12-12 in FIG. 6.

The latch 140 of the basket assembly 100 is coupled to the basket 110 and, in particular, to the upper rim 112 of the basket 110, as shown in FIGS. 5-7. FIGS. 10 and 11 illustrate the latch 140 in detail. The latch 140 is generally U-shaped, and it includes a plate 141 and a resilient spring member 142 opposite the plate 141. The resilient spring member 142 has a lip 143 that is configured to releasably engage the upwardly facing shoulder 136 of the latch mount 130, as shown in FIG. 12. The latch 140 also includes a plurality of flanges 144a, 144b configured to the coupled to the upper rim 112 of the basket 110. More specifically, the upper rim 112 is bent to pass below flanges 144a and to pass between flanges 144b, as best seen in FIG. 7, to secure the latch 140 to the upper rim 112 of the basket 110.

In the illustrated embodiment, the latch 140 is an integrally molded plastic piece; however, in an alternative embodiment, the spring member of the latch can be formed as a separate piece that is hinged or otherwise attached to the plate of the latch. In another embodiment, the latch mount may be configured to "spring" over the latch, so that the latch need not include a resilient spring member.

Opening and closing of the basket 110 will now be described with reference to FIGS. 5-7 and 12. FIGS. 6, 7, and 12 show the latch 140 in the closed position. To open the basket 110, a user can rest the palm of a hand against the rear face of plate 141 of the latch 140 and curl his fingers around the underside of the latch 140 to contact resilient spring member 142. By pulling the resilient spring member 142 toward the plate 141, the user disengages lip 143 from the upwardly facing shoulder 136 of the latch mount 130. The latch 140, and hence the basket 110, then can drop away from the latch mount 130 to the open position shown in FIG. 5. To close the basket 110, the user simply needs to lift the latch 140 toward the latch mount 130 until the upper surface 145 of lip 143 (see FIG. 10) contacts the lower face 138 of the latch mount 130. As the user continues to lift the latch 140, the resilient spring member 142 flexes toward the plate 141, allowing the upper surface 145 to slide past the lower face 138, until the lip 143 clears the lower face 138. The resilient spring member 142 then resumes its unbiased position, and the lip 143 of the latch 140 enters the pocket 134 of the latch mount 130 to secure the latch 140 to the latch mount 130.

The present basket assembly 100 allows a user to access the interior of the basket 110 when the seat back 52 of the child seat 50 is partially or fully reclined, for example, as occurs when an infant carrier is mounted to the child seat 50. In addition, the basket assembly 100 discourages overloading of the basket 110. That is, when the basket 110 is opened, the basket 110 rotates downward (toward the ground surface on which the stroller rests) and forward (toward the front wheels of the stroller). Accordingly, the size of the basket interior decreases when the basket 110 is opened and advantageously limits the carrying capacity of the basket.

Although the basket assembly 100 has been described in connection with a specific type of stroller frame, it will be understood that the basket assembly 100 can be implemented on strollers having different types of frames, such as a jogging strollers, umbrella strollers, non-collapsible strollers, or other collapsible strollers.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. A stroller comprising:
   a stroller frame;
   a basket frame including a pair of arms mounted to the stroller frame and a rear cross member extending between the pair of arms;
   a latch mount coupled to the rear cross member;
   a basket comprising a frame rim pivotally coupled to the basket frame to allow the basket to move relative to the basket frame between a closed position and an open position; and a latch coupled to the basket to releasably engage the latch mount when the basket is in the closed position.

2. The stroller of claim 1, wherein the frame rim includes an upper rim, and the latch is secured to the upper rim of the basket.

3. The stroller of claim 2, wherein the basket further includes an enclosure coupled to the upper rim.

4. The stroller of claim 2, wherein the latch includes at least one flange configured to be coupled to the upper rim of the basket.

5. The stroller of claim 1, wherein the stroller frame includes a handle assembly having a pair of push arms, and each arm of the basket frame is pivotally coupled to a respective push arm of the handle assembly.

6. The stroller of claim 5, wherein the stroller frame includes a pivot extending between each arm of the basket frame and each respective push arm.

7. The stroller of claim 1, wherein the latch includes a resilient spring member to releasably engage the latch mount.

8. The stroller of claim 7, wherein the latch is generally U-shaped and includes a plate opposite the resilient spring member.

9. The stroller of claim 1, wherein the latch mount includes a pocket having an upwardly facing shoulder, and the latch includes a resilient spring member adapted to releasably engage the shoulder.

10. The stroller of claim 1, wherein the latch mount includes a channel, and the rear cross member of the basket frame extends through the channel.

11. A stroller comprising:
a stroller frame;
a basket frame mounted to the stroller frame, the basket frame having a rear cross member; and
a basket directly mounted on the stroller frame to move between a closed position and an open position relative to the basket frame;
a latch mount coupled to the rear cross member; and
a latch coupled to the basket to releasably engage the latch mount,
wherein, when the basket is moved to the open position, the basket moves downward from the basket frame and forward relative to a rear of the basket frame, and
wherein, when the basket is in the open position, access to an interior of the basket is provided by an access opening that is disposed above the basket and below the basket frame.

12. A stroller comprising:
a stroller frame;
a basket frame mounted to the stroller frame, and
a basket directly mounted on the stroller frame to move between a closed position and an open position relative to the basket frame;
wherein, when the basket is moved to the open position, the basket moves downward from the basket frame and forward relative to a rear of the basket frame, and
wherein, when the basket is in the open position, access to an interior of the basket is provided between the basket and the basket frame,
wherein the interior of the basket is smaller in the open position than in the closed position.

13. A stroller comprising:
a basket frame including a rear cross member;
a latch mount directly mounted on the rear cross member;
a basket comprising a frame rim pivotally coupled to the basket frame to allow the basket to move between a closed position and an open position relative to the basket frame; and
a latch coupled to the basket to releasably engage the latch mount when the basket is in the closed position.

14. The stroller of claim 13, wherein the frame rim comprises a wireframe member.

15. The stroller of claim 13, wherein the frame rim is shaped to follow the basket frame when the basket is in the closed position.

16. The stroller of claim 13, wherein the frame rim comprises hooks to pivotally couple the frame rim to the basket frame.

17. A stroller comprising:
a stroller frame including a handle assembly having a pair of push arms;
a basket frame including a pair of arms mounted to the stroller frame and a rear cross member extending between the pair of arms, each arm of the basket frame being pivotally coupled to a respective push arm of the handle assembly;
pivots on the stroller frame, one pivot extending between each arm of the basket frame and each respective push arm;
a latch mount coupled to the rear cross member;
a basket mounted to move relative to the basket frame, wherein the basket includes an upper rim, and the upper rim includes a pair of arms and a rear cross member extending between the arms, each arm terminating in a hook adapted to be pivotally mounted to the respective pivots; and
a latch coupled to the basket to releasably engage the latch mount, thereby allowing the basket to move between a closed position and an open position relative to the basket frame.

18. A stroller comprising:
a stroller frame;
a basket frame mounted to the stroller frame, and
a basket mounted to move between a closed position and an open position relative to the basket frame;
wherein, when the basket is moved to the open position, the basket moves downward from the basket frame and forward relative to a rear of the basket frame, wherein, when the basket is in the open position, access to an interior of the basket is provided between the basket and the basket frame, and wherein the interior of the basket is smaller in the open position than in the closed position.

* * * * *